United States Patent [19]

Mayer

[11] Patent Number: 5,185,852
[45] Date of Patent: Feb. 9, 1993

[54] ANTIALIASING APPARATUS AND METHOD FOR COMPUTER PRINTERS

[75] Inventor: Christopher M. Mayer, Westford, Mass.

[73] Assignee: Digital Equipment Corporation, Maynard, Mass.

[21] Appl. No.: 708,482

[22] Filed: May 31, 1991

[51] Int. Cl.⁵ .......................................... G06K 15/00
[52] U.S. Cl. .................................... 395/109; 395/101
[58] Field of Search .............................. 364/518–520; 358/298, 455–459; 346/157; 355/246; 395/101, 109, 115; 400/191, 201

[56] References Cited

U.S. PATENT DOCUMENTS

4,677,571 6/1987 Riseman et al. .................... 358/456

Primary Examiner—Arthur G. Evans
Attorney, Agent, or Firm—Ronald E. Myrick; Barry N. Young; Ronald C. Hudgens

[57] ABSTRACT

Printer apparatus provides a grayscale bitmap from a bitonal bitmap of desired output data. The apparatus includes a mapping function implemented as a lookup table for assigning predetermined grayscale values to bitonal bitmap pixels according to the neighborhood or subset of bitonal bitmap pixels including the subject pixel. From the grayscale values the laser of the laser printer is modulated to produce shades of gray during the printing of the desired data.

25 Claims, 6 Drawing Sheets

ANTIALIASING APPARATUS AND METHOD FOR COMPUTER PRINTERS

BACKGROUND OF THE INVENTION

Typically included in a computer system or computer network are (i) a digital processor, (ii) one or more workstations each defined by at least one display monitor (CRT), a keyboard and/or mouse, and (iii) a common printer (i.e., a printer to which users have access from the workstations). Users at respective workstations generate output to various locations, for instance internal memory files for storage, the workstation CRT for viewing on the video screen thereof, or the printer for a so called "hard copy" printout of the output information. As more and more users depend on hard copy printouts of computer generated information, greater desires exist for increased detail and accuracy in printing from the printer.

Generally, laser printers are among the more technically advanced printers of today and evolved from two other forms of printing, namely xerography and dot matrix printing, in response to the growing desire for more detailed and accurate printing. While xerography is a form of electrophotography in which an image is transferred from light to paper, dot matrix printing utilizes groups of dots to form geometric elements. As a result, today's laser printers usually accept orthogonal bitmaps of binary data. The laser beam is swept across the page as the page is rolled through the printer, modulating one row of data (a scan line) per pass. During each scan line, the paper is moved forward one pixel width. To obtain a quality result, it is important to produce pixels of consistent small size and shape at a correct location on the page being printed, corresponding to the bitmap data. Many advances have been made in decreasing the pixel size and refining its shape to be more uniform and square.

Most new advances in printers today focus on increasing the resolution, since it is relatively easy to form uniform dots. Common laser printers today are capable of printing 300 pixels per inch in both directions. However, increasing resolution has its costs; the memory required to hold one page of bitmap data increased from 60,000 bytes in a typical 72 DPI dot matrix printer to more than 1,000,000 bytes in a 300 DPI laser printer. Increasing resolution has serious repercussions on the amount of memory used to store bitmap images and the bandwidth required of printers to produce images at the same speed and cost.

Further, the quality of the printer output may be increased without increasing the resolution by a technique called "antialiasing". This technique has its basis in discrete time signal processing; it is a filtering technique to remove high frequency edges from pictures. To that end, in antialiasing, the high frequency components are filtered out of the printout (via a low pass filter and the like) and smoother edges result. The resulting image must then be printed on a grayscale capable printer. Thus antialiasing provides a method of increasing the effective resolution without increasing the pixel spacing.

As used herein "grayscaling" refers to the ability of an output device to produce shades of gray. That term is not to be confused with the term "halftoning" which is the process whereby intermediate shades of gray are produced by arranging patterns of lighter and darker pixels.

However, laser printers are designed to print bitonally, i.e., are supported by a bitmap whose pixels are either on (black) or off (white). This being the case, modifications must be made to the print engine to allow grayscale data to be printed. Although traditional methods of antialiasing can be used to generate grayscale pictures for the printer, many existing computer applications (programs) do not support antialiased output (i.e. such applications only form a bitonal bitmap of the output). In addition, most antialiasing methods belong to one of two categories of filters, prefilters and postfilters. A prefilter is employed to low pass filter output data before the data is scan converted into a bitmap. A postfilter is used to low pass filter output data after scan conversion of the data.

One example of a post filter is "supersampling". In supersampling the subject image (output data) is drawn bitonally (scan converted) on a supersampled grid, i.e. a high resolution bitmap. After the output data is scan converted, a filter is mapped across the supersampled image (high resolution bitmap) and combines clusters of samples to form grayscale pixels. The disadvantage of supersampling is that it is computationally expensive and extremely time consuming.

A prefilter version of supersampling is "area sampling". In this method, area computations are performed directly from subject output (image) data before scan conversion of the data to a high resolution bitmap. Since the grayscale values result directly from the subject output data, area sampling yields highly accurate results. However, overlapping objects become a serious problem in area sampling. In supersampling, the scan conversion takes care of overlapping areas by mapping them onto the same supersampled pixels. However, in area sampling, all objects must be considered simultaneously to resolve such conflicts. Otherwise, overlapping areas from different objects would be counted twice in computing grayscale value of the corresponding pixel.

Other antialiasing methods include the Gupta-Sproull antialiased scan conversion for lines. See "Filtering Edges for Grayscale Displays", by S. Gupta and R. F. Sproull, in *Computer Graphics*, 15(3): pages 1-5, August, 1981. Gupta-Sproull antialiasing uses the endpoints of a line and a pixel filter function to approximate antialiasing. In particular, a table of grayscale values is computed by performing an integration (convolution) over the intersection of a conical filter and a one-pixel wide line. Scan conversion of arbitrary lines is then performed using an incremental algorithm, similar to Bresenham's line drawing routine. J. E. Bresenham's line drawing routine is given in "Algorithm for Computer Control of a Digital Plotter", *IBM Systems Journal*, 4(1): pages 25-30, July, 1965. The Gupta-Sproull algorithm is also easily adapted to antialias polygon edges and endpoints of a line by using different tables.

Few general curve antialiasing routines exist. One such method is Turner Whitted's method of using antialiased brushes to draw arbitrary curves. See "Antialias Line Drawing Using Brush Extension", by Turner Whitted, in *Computer Graphics*, 17(3): pages 151-156, July, 1983. Briefly, the brush is first constructed at high resolution (i.e. a supersampled bitmap) and then digitally filtered to reduce the component frequencies to below the Nyquist rate of the drawing. Each pixel of the brush is additionally tagged with a depth (z), which prevents it from being overwritten by less important pixels as the brush moves incrementally across the page. The supersampled brush is then dragged across the page, but only the brush pixels which exactly coincide with the lower resolution page pixels are copied to the page. A generic z-buffer algorithm is used to determine if the page pixel should actually be updated. There are several disadvantages to antialiased brushes. For every different type of a line a different brush is needed, so libraries of brushes must be kept. Additionally the z-buffer algorithm is computationally expensive; the brush must have 3 or 4 bits of depth information per pixel to operate properly.

When displaying fonts, it is time consuming to antialias each letter as it is scan converted. Fonts are especially difficult because each character is both complex, consisting of possibly dozens of strokes, and interconnected. Rather than antialias during scan conversion, it is typically better to store grayscale antialiased copies of the font in arrays and simply copy (bit-blit) the characters to the video memory. See "The Display of Characters Using Gray Level Sample Arrays", by John E. Warnock, in *Computer Graphics,* 14(3): pages 302-307, July, 1980. However, a common problem with scan converting fonts occurs when the output resolution (pixel spacing) is too course to properly position the glyphs. Proper subpixel positioning can be achieved by prestoring various different positioned fonts in separate arrays, and bit blitting from the correctly subpositioned font array. Thus, this method has the disadvantage of using a large amount of memory.

Another antialiasing algorithm, scan converts antialiased polygons using a table lookup to draw antialiased edges. For each pixel, the pixel edge-polygon edge intersections are computed, and these values are used as the address to a lookup table. From that address, the lookup table provides a grayscale value of the pixel and surrounding pixels. See "Efficient Alias-Free Rendering Using Bit Masks and Look Up Tables", by L. Westover, G. Abram and T. Whitted, in *Siggraph ACM,* 19(3): pages 53-59, 1985. Most edges intersect at two points, creating either triangular or trapezoidal pieces. More complex intersections can be usually handled by representing an area covered as a combination of simple fragments, i.e. more than one lookup is performed in the table and values are added or subtracted to yield the final grayscale value. Since an edge contained within a pixel affects surrounding pixels as well, lookup tables are computed for all the immediately surrounding pixels and grayscale values are summed. One disadvantage of this method is the inability to accurately compute highly curved line segments, i.e. this method would probably not be suitable for small text due to the tight curves which compose most letters.

There are several serious limitations with the above-discussed methods of antialiasing. All the current techniques (with the exception of supersampling) are prefilters, so they operate solely on analytic or parametric curved outline data (not bitmaps or images). On the other hand, supersampling is computationally expensive, so it is not an attractive alternative. A more serious, although perhaps less academic problem is that each of the above antialiasing methods require changes to the computer scan conversion algorithm so that grayscale data can be generated. This is a very serious limitation because current graphics packages cannot be easily adapted to produce antialiased bitmaps. For example, PostScript ® would be very difficult to adapt to print grayscale bitmaps because every scan conversion algorithm would have to be changed to an antialiased counterpart.

Accordingly, there is a need for implementing antialiasing in the printing process of computer systems.

SUMMARY OF THE INVENTION

The present invention implements antialiasing in the printing process of a computer system, and more specifically makes use of current bitonal scan conversion routines, to convert bitonal bitmaps to antialiased (grayscale) bitmaps with little computation.

In a preferred embodiment, printer apparatus of the present invention is employed in a computer system having (a) a digital processor, (b) a printer, (c) means for generating a bitonal bitmap to support printer printout of processor output. The bitonal bitmap is formed of a plurality of pixels, each pixel having a value. The printer apparatus of the present invention employs a mapping member coupled between the means for generating a bitonal bitmap and the printer. The mapping member forms a grayscale bitmap from the bitonal bitmap, the grayscale bitmap having a plurality of pixels each corresponding to a different pixel of the bitonal bitmap. To accomplish this, the mapping member receives the bitonal bitmap from the generating means, and for each pixel of the bitonal bitmap, assigns a predetermined grayscale value to a corresponding pixel in the grayscale bitmap.

In particular, the mapping member assigns predetermined grayscale values to corresponding pixels in the grayscale bitmap according to a predefined mapping function. The predefined mapping function includes for each subject pixel of the bitonal bitmap, mapping a subset of pixels of the bitonal bitmap including the subject pixel to a predetermined grayscale value.

In a preferred embodiment the mapping member includes a working memory. The working memory has a plurality of memory addresses and at each memory address holds a different one of the predetermined grayscale values. As such, for each subject pixel of the bitonal bitmap, the mapping member (a) establishes a subset of pixels of the bitonal bitmap including the subject pixel, (b) defines a memory address to the working memory from pixel values of the established subset of pixels, and (c) using the defined memory address, accesses the predetermined grayscale value held at the defined memory address. In turn, the mapping member assigns the accessed predetermined grayscale value to the pixel in the grayscale bitmap corresponding to the subject pixel of the bitonal bitmap.

It is understood that in other embodiments of the present invention, various other memory devices (hardware and/or software) may be used instead of a working memory. For example, a lookup table implemented in software may be used for mapping subsets of pixels of the bitonal bitmap to predetermined grayscale values. Other such alternatives and variations of the same are within the purview of one skilled in the art.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
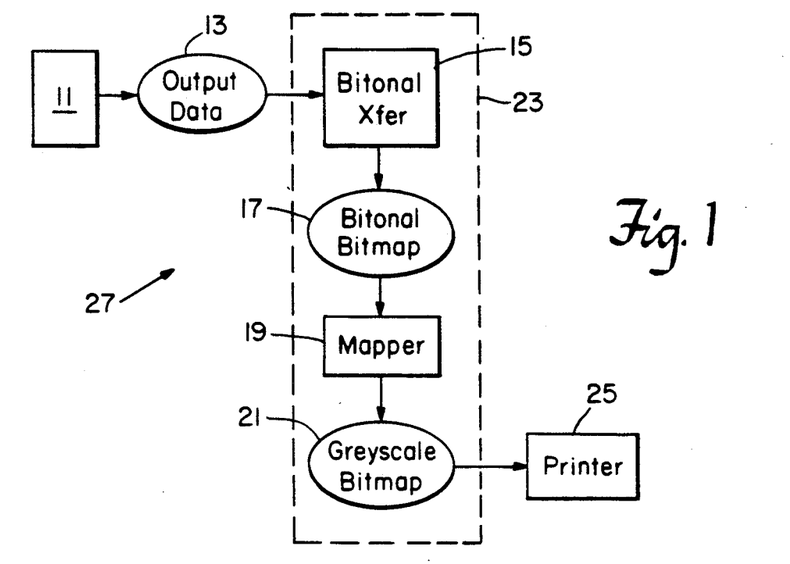
FIG. 1 is a block diagram of a computer system employing the antialiasing printer apparatus and method of the present invention.

Illustrated in FIG. 1 is a block diagram of an embodiment of the present invention in a computer system 27. Generally the computer system 27 includes a digital processor 11 which produces various output data 13. As understood (although not shown), one or more workstations are coupled to the digital processor 11 and include CRT monitors, keyboards and/or mouses. Various programs (computer applications) are run from the workstations which in turn drive digital processor 11 to generate output data 13.

In order to display the output data 13, either on a video screen of a workstation display monitor or on paper through a printer, the digital processor transmits the data 13 to an I/O processing assembly 23. The I/O processing assembly 23 forms a bitmap from the output data 13. That bitmap is then used to drive the display monitor and/or printer to display output data 13. In the present invention, I/O processing assembly 23 forms a bitonal bitmap 17 from output data 13 and from the bitonal bitmap forms a grayscale bitmap 21 which is used to drive the desired display device (CRT monitor and/or printer). It is the forming of a grayscale bitmap 21 from the bitonal bitmap 17 to which the present invention is particularly directed.

The foregoing is accomplished as follows. I/O processing assembly 23 employs a bitonal scan conversion 15 for forming a bitonal bitmap 17 from output data 13. The bitonal scan conversion 15 is implemented by known methods and techniques, such as those described in *Computer Graphics, Principles and Practices*, second edition, editors S. K. Feiner, J. D. Foley., A. VanDam and J. F. Hughes, §3.2.1, pages 73-74 and herein incorporated by reference.

Following the bitonal scan conversion 15 is a mapping member or mapper 19. For each pixel in the formed bitonal bitmap 17, mapper 19 provides a grayscale value and ultimately forms a grayscale bitmap 21 from the bitonal bitmap 17. In a preferred embodiment, mapper 19 employs a lookup table 43 (FIG. 2b) for determining grayscale values. For each pixel in the bitonal bitmap 17, mapper 19 forms an entry address into the lookup table from a subset of neighboring pixels of the subject bitonal bitmap pixel and including the subject pixel. Using the formed entry address, mapper 19 accesses the corresponding grayscale value stored at that entry address in the lookup table. Mapper 19 then assigns the obtained grayscale value to a pixel in the grayscale bitmap 21 which has the same relative position to the whole grayscale bitmap 21 that the subject pixel has to the whole bitonal bitmap 17. Mapper 19 repeats this process for each pixel of bitonal bitmap 17 to assign grayscale values to the pixels of grayscale bitmap 21 and thus establish grayscale bitmap 21.

Upon completion of grayscale bitmap 21, the I/O processing assembly 23 transmits the grayscale bitmap 21 across I/O bus lines and the like to the desired output device. In particular, I/O processing assembly 23 transmits grayscale bitmap 21 to a printer 25 for hardcopy output of desired output data 13 in grayscale. Preferably printer 25 is a grayscale capable laser printer.

In more particular terms, mapper 19 is formed as follows and illustrated in FIGS. 2a-2i. Where shades of black, white and different grays are discussed numerically or mathematically, black is assigned a value of 1.0, white is assigned a value of 0.0 and gray shades are real numbers between the black and white values. For example, 0.25 denotes a shade of gray which is 25% black and 75% white. This numerical scale for grayscale is for purposes of illustration and not limitation. It is understood that other numerical scales for grayscale (e.g. 0 to 127) are suitable for the present invention.

Figure 2A:
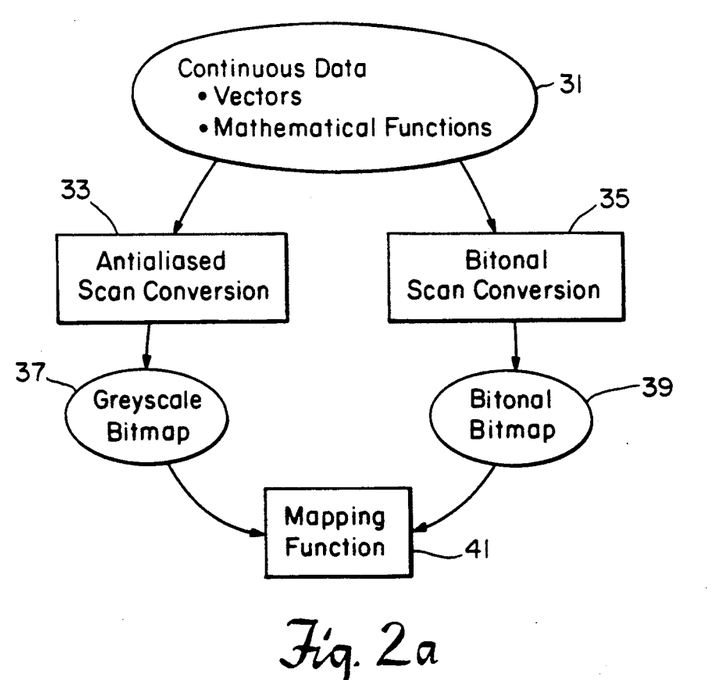
FIGS. 2a-2i are schematic illustrations of the process for defining the mapping function employed in the present invention apparatus of FIG. 1.

The formation of mapper 19 begins in FIG. 2a with the collection of typical continuous data at 31. Such data is representative of various output data 13 expected to be encountered by the present invention. The collection of continuous data at 31 is conceptualized as a combination of at least two components, edge and fill. Fill is the graphical component used to shade areas, such as the solid parts of letters and half tones in images. Edge is used as transitions between different areas of fill. These components are represented by a learning pattern illustrated in FIG. 3.

Figure 3:
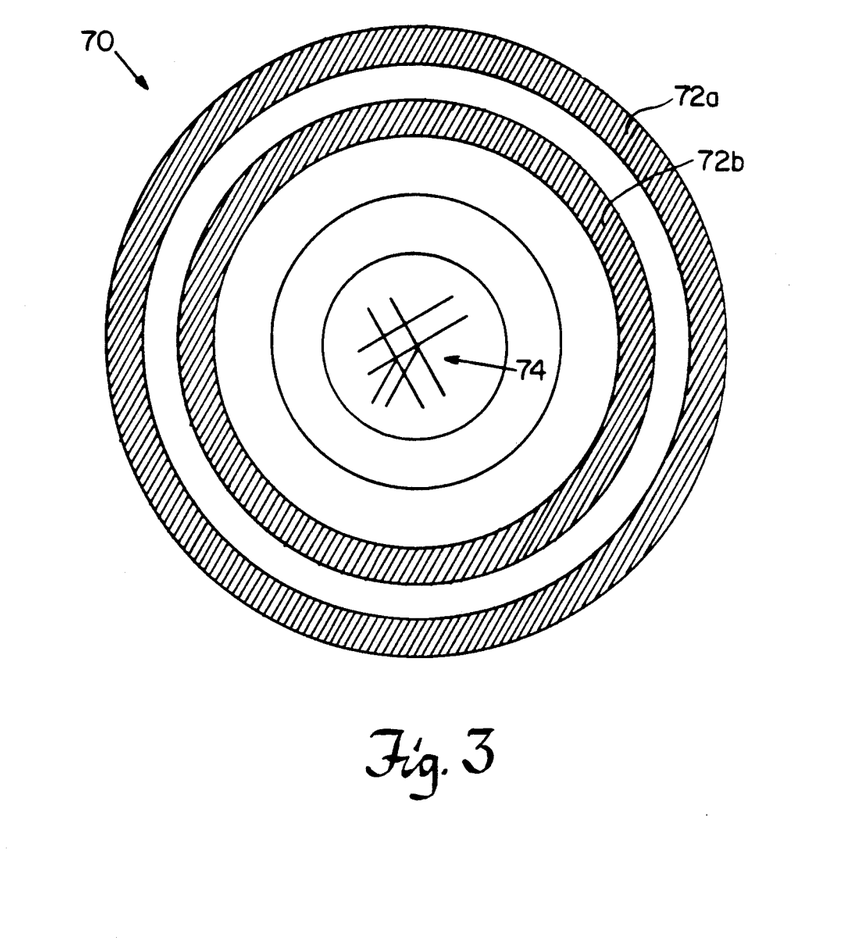
FIG. 3 is an illustration of a learning pattern employed by the present invention in the definition of the mapping function of FIGS. 2a-2i.

Referring to FIG. 3, learning pattern 70 is formed of concentric circles with different (decreasing) diameters and equally spaced from each other. In a preferred embodiment, the circles are spaced about 10° apart from each other. Curves and angled lines of subject images are represented by line segments of the circles from learning pattern 70. Every other intermediate region 72a, 72b between the outermost circles are preferably shaded to represent "fill". The contrast between shaded intermediate regions 72a, 72b and unshaded intermediate regions represent "edge". Randomly positioned (overlapping) lines 74 in the center of learning pattern 70 represent overlapping lines.

Thus learning pattern 70 provides a representation for each of angled lines, edges, fill and overlapping lines. It is the mathematical functions and vectors for each of these components from learning pattern 70 that represent alphanumeric characters of text and geometric areas of images alike at 31 in FIG. 2a.

It is understood that other spacing between circles and other patterns of filling between circles may be employed in the learning pattern. The learning pattern of FIG. 3 is for purposes of illustration and not limitation. For example, other designs of the learning pattern may include no filled intermediate regions between the circles forming the learning pattern, or letters instead of circles.

After representing typical continuous data of interest at 31, the present invention process converts the data using two methods, antialiased scan conversion 33 and bitonal scan conversion 35. Antialiased scan conversion 33 forms a grayscale bitmap 37 of data 31 while bitonal scan conversion 35 forms bitonal bitmap 39 of data 31. The representation of the continuous data as a combination of edge and fill simplifies the antialiasing conversion at 33. In particular, filled regions no longer need to be considered during the antialiasing conversion. Only edges need to be filtered and the antialiasing rules are as follows.

Antialiasing rule (i)—A transition between black and white should occur at the spatial Nyquist Rate, i.e., edges must take a full pixel wide for black to white transitions. This rule is derived from the definition of the Nyquist Rate; the maximum frequency allowable is equal to one half the sampling frequency. A transition from black to white and back to black corresponds to one period, so a transition from black to white corresponds to half a period. By the Nyquist criterion, a transition from black to white must occur over at least one sampling period. For less extreme transitions, such as between two similar shades of gray, the width of the edge can be scaled proportionally to the intensity difference. Analytically, the minimum width of an edge between two different shades of gray ($G_A$ and $G_B$) is $$W_{edge} = |G_B - G_A|$$

Antialiasing rule (ii)—Edges cannot be of a length shorter than one pixel for a black/white transition. This is justified by the same reasoning as the previous width argument. Similarly, between shades of gray an edge can be shorter.

$$L_{edge} = |G_B - G_A|$$

Antialiasing rule (iii)—When edges cross, special methods must be used to antialias the region. Consider drawing lines $i_1$ and $i_2$, which overlap at (x,y). Many different approaches can be taken:
First consider what it means to have two lines, i.e. (a) one line is actually placed on top of the other, or (b) both lines are considered equal. If line $i_1$ is on top, then line $i_2$ could be scan converted first and those pixels should be used as background values while converting the second line.

$$I(x,y) = I_1 + I_2 + \alpha\beta i_2$$

where $\alpha\beta$ is a background blending function, such as that in "Antialised Line Drawing Using Brush Extension," by Turner Whitted in *Computer Graphics*, 17(3): pages 151-156, July 1983. This unfortunately leads to the resulting intersection being overly bright. If instead black is used as the background when the second line is drawn, then the points around the intersection will not be bright enough.

$$I(x,y) = I_1$$

When both lines are considered equally, things become more complex. Clearly, if the intensities are simply added, the result is too bright. Even worse, the result of adding bright lines may fall off the top of the intensity scale, so the result needs to be truncated.

$$I_{combined} = \mathrm{trunc}[I_1 + I_2]$$

Supersampling can be used to intersect both lines; the lines are drawn at very high resolution, and the supersampled intersection is simply converted to grayscale. This method is attractive because the intensities do not fall off the scale, and consistent results can be obtained. A drawback is the computational expense. Supersampling only considers opaque lines.

$$I(x,y) = I_1 + I_2 - f_{overlap}(i_1, i_2)$$

For ideal transparent line drawing, the energy is added linearly and intensities are added logarithmically. Adding intensities logarithmically might result in an intensity off the scale, so the resulting intensity must be truncated.

$$E_{combined} = \mathrm{trunc}[E_1 + E_2]$$

$$I_{combined} = \mathrm{trunc}[\log_B[B^{I_1} + B^{I_2}]]$$

This process is computationally expensive, so simpler methods of combining lines are normally used.
A very simple but reasonably effective method is to take the maximum of the two intensities at every point when scan converting.

It is understood that one or a combination of the above methods or other methods for scan converting crossed lines is suitable for the present invention.

In the preferred embodiment the antialiased scan conversion 33 of FIG. 2a is a variation of the "Gupta-Sproull Antialiased Lines" discussed in *Computer Graphics Principles and Practices* second edition, by S. K. Feiner et al., pages 136-137 and herein incorporated by reference.

The bitonal scan conversion 35 is implemented by common methods and techniques as mentioned previously in *Computer Graphics Principles and Practices* second edition, by S. K. Feiner et al., §3.2.1 pages 73-74.

After the antialiased scan conversion 33 forms a grayscale bitmap 37 from continuous data 31 and bitonal scan conversion 35 forms a bitonal bitmap 39 from the continuous data at 31, a mapping function 41 between the formed grayscale bitmap 37 and bitonal bitmap 39 is established. That is, for each pixel position in the bitonal bitmap 39, there is a pixel with a value of 0 or 1. And at the analogous position in the grayscale bitmap 37, there is a corresponding pixel with a grayscale value, for example in the range 0 to 127. For each pixel of the bitonal bitmap 39, mapping function 41 provides the determination of the grayscale value of the corresponding pixel in the grayscale bitmap 37.

Because continuous data 31 is representative of most any data of interest, mapping function 41 is generalized to apply to all such bitonal bitmaps. As such, the present invention provides from the mapping function 41 the lookup table 43 mentioned above. This is accomplished in the preferred embodiment as described next with reference to FIGS. 2b-2i.

Figure 2B:
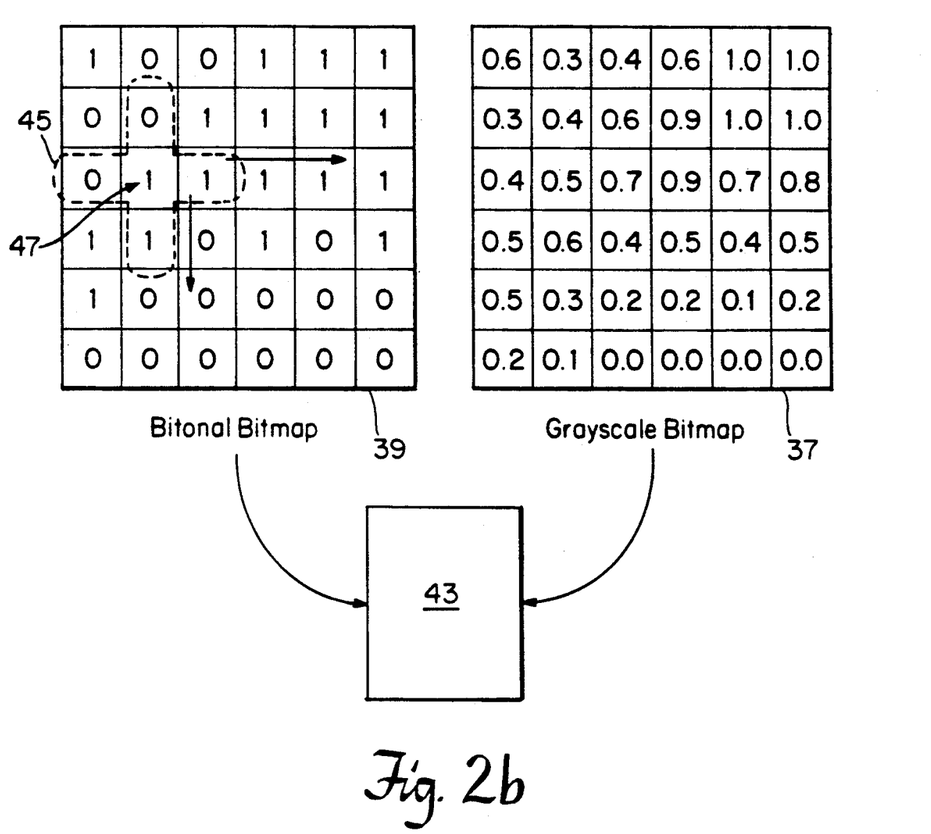

A sampling window 45, outlined by the dotted line in FIG. 2b, is used to evaluate each pixel of bitonal bitmap 39 amongst neighboring pixels. As illustrated in FIG. 2b, for each pixel position in bitonal bitmap 39, the center 47 of the sampling window 45 is placed on a subject bitonal bitmap pixel. From the pixel values of the subset of bitonal bitmap pixels covered by sampling window 45, an entry address to lookup table 43 is formulated. Note the subset includes the subject pixel of the bitonal bitmap 39. The value of the grayscale bitmap pixel corresponding to the subject pixel at sampling window center 47 is stored at the formulated entry address in the lookup table 43. The sampling window 45 is moved from one pixel position to the next through all pixel positions in the bitonal bitmap 39 to formulate entry addresses of lookup table 43. And grayscale values from corresponding pixels of grayscale bitmap 37 are stored at the formed lookup table entry addresses.

Figure 2C:
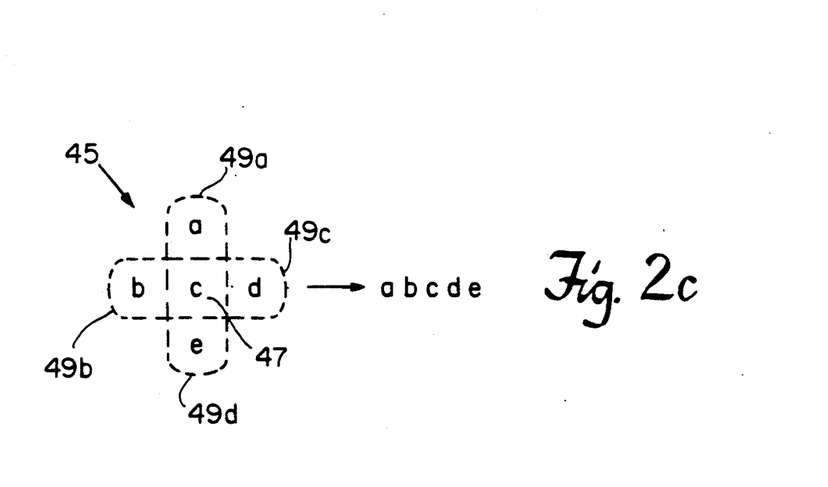

In particular, the sampling window 45 is generally "t" shaped as illustrated in FIG. 2c. The center 47 of the sampling window 45 is positioned on the bitonal bitmap 39 pixel of interest. Arms 49 a, b, c and d extending from sampling window center 47 along longitudinal and lateral axes then fall on adjacent or neighboring pixels of the pixel of interest. The values held at the pixels covered by sampling window 45 are then read in a left to right, top-down fashion to provide a 5 bit address. The sampling window 45 is then moved one pixel position so that center 47 is positioned on the next bitonal bitmap pixel of interest. A 5-bit address is formulated for that window position and so on.

Figure 2D:
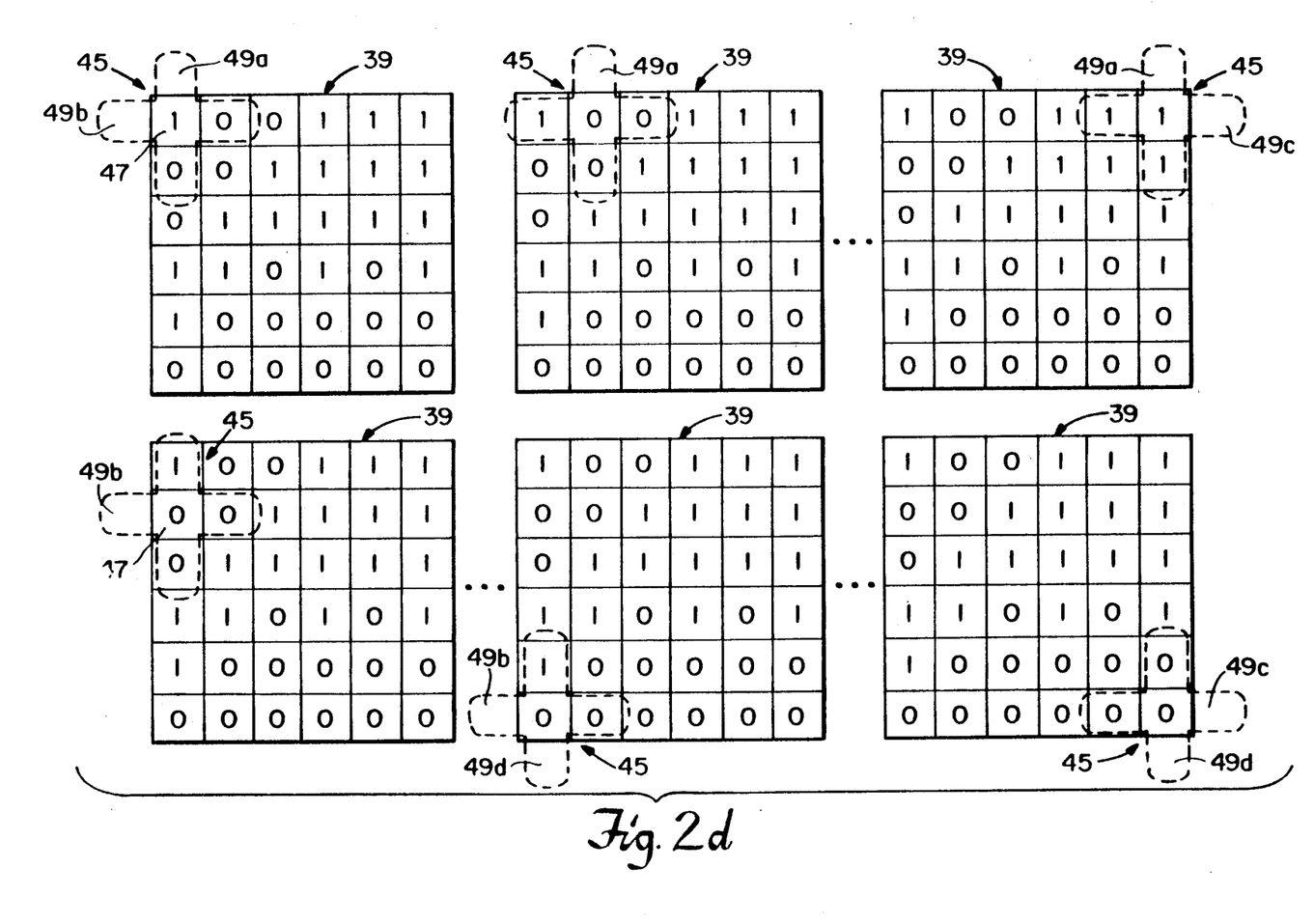

FIGS. 2c and 2d are illustrative where the values of the pixels covered by sampling window 45 are read in order from sampling window arm 49a to sampling window 49b, to sampling window center 47 to sampling window arm 49c and ending with sampling window arm 49d. In the illustration of FIG. 2c, the value of the pixel covered by the sampling window arm 49a is a, the value of the pixel covered by sampling window arm 49b is b, the value of the pixel covered by sampling window center 47 is c, the value of the pixel covered by the sampling window arm 49c is d, and the value of the pixel covered by sampling window arm 49d is e. As a result, the address (a, b, c, d, e) is formulated from the values of the subset of pixels covered by the sampling window 45 with center 47 positioned on a bitonal bitmap pixel of interest.

As illustrated in FIG. 2d, sampling window 45 is first positioned with center 47 covering the first pixel (i.e., upper left corner) of bitonal bitmap 39. In this position, arms 49a and 49b of sampling window 45 are not positioned on any pixel of bitonal bitmap 39. In cases where one or more arms 49 of the sampling window 45 do not fall on a pixel of the bitonal bitmap 39, a zero value is assumed for those arms 49. Thus, the resulting 5-bit address formulated from sampling window 45 in the first pixel position is "00100". Next the sampling window 45 is moved one pixel position to the right such that center 47 is placed on the second pixel in the first row of bitonal bitmap 39. In this position arm 49a of sampling window 45 does not fall on any pixel or bitonal bitmap 39. Thus, a zero is assumed for arm 49a and the resulting formulated 5-bit address from sampling window 45 in this position is "01000".

In a similar fashion, sampling window 45 is moved from one pixel position to the next in the first row of pixels of bitonal bitmap 39. When sampling window 45 is centered at the last pixel position in the first row of bitonal bitmap 39, arms 49a and 49c do not fall on any pixel of the bitonal bitmap 39 as shown in FIG. 2d. Thus zero values are assumed for arms 49a and 49c. To that end, the 5-bit address formulated from sampling window 45 in this position is "01101".

After that position the sampling window 45 is moved to the first pixel of the second row of pixels in bitonal bitmap 39. In this position, center 47 covers the pixel of interest (i.e., the first pixel of the second row) and arm 49b does not fall on any pixel of the bitonal bitmap 39. Thus a zero value is assumed for arm 49b and the resulting formulated address is "10000". In a similar fashion to the foregoing, sampling window 45 is moved one pixel position at a time from left to right along a row of bitonal bitmap 39 and from one row to a succeeding row. Upon arriving at the bottom row of bitonal bitmap 39, the center 47 of sampling window 45 is positioned on the lower left corner of bitonal bitmap 39 (i.e., the first pixel position of the last row of bitonal bitmap 39). In this position the arms 49b and 49d of sampling window 45 do not fall on any pixel of bitonal bitmap 39. Thus zero values are assumed for arms 49b and 49d, and the resulting formulated address is "10000". The sampling window 45 is likewise moved one pixel position at a time to the right along the last row of pixels of bitonal bitmap 39. At the last pixel position of bitonal bitmap 39, the sampling window 45 has center 47 positioned on the lower right corner pixel of bitonal bitmap 39 (i.e., the last pixel position of the last row of bitonal bitmap 39). In this position, arms 49c and 49d do not fall on any pixel of bitonal bitmap 39, and thus assume zero values. To that end, the formulated address is "00000".

Figure 2E:
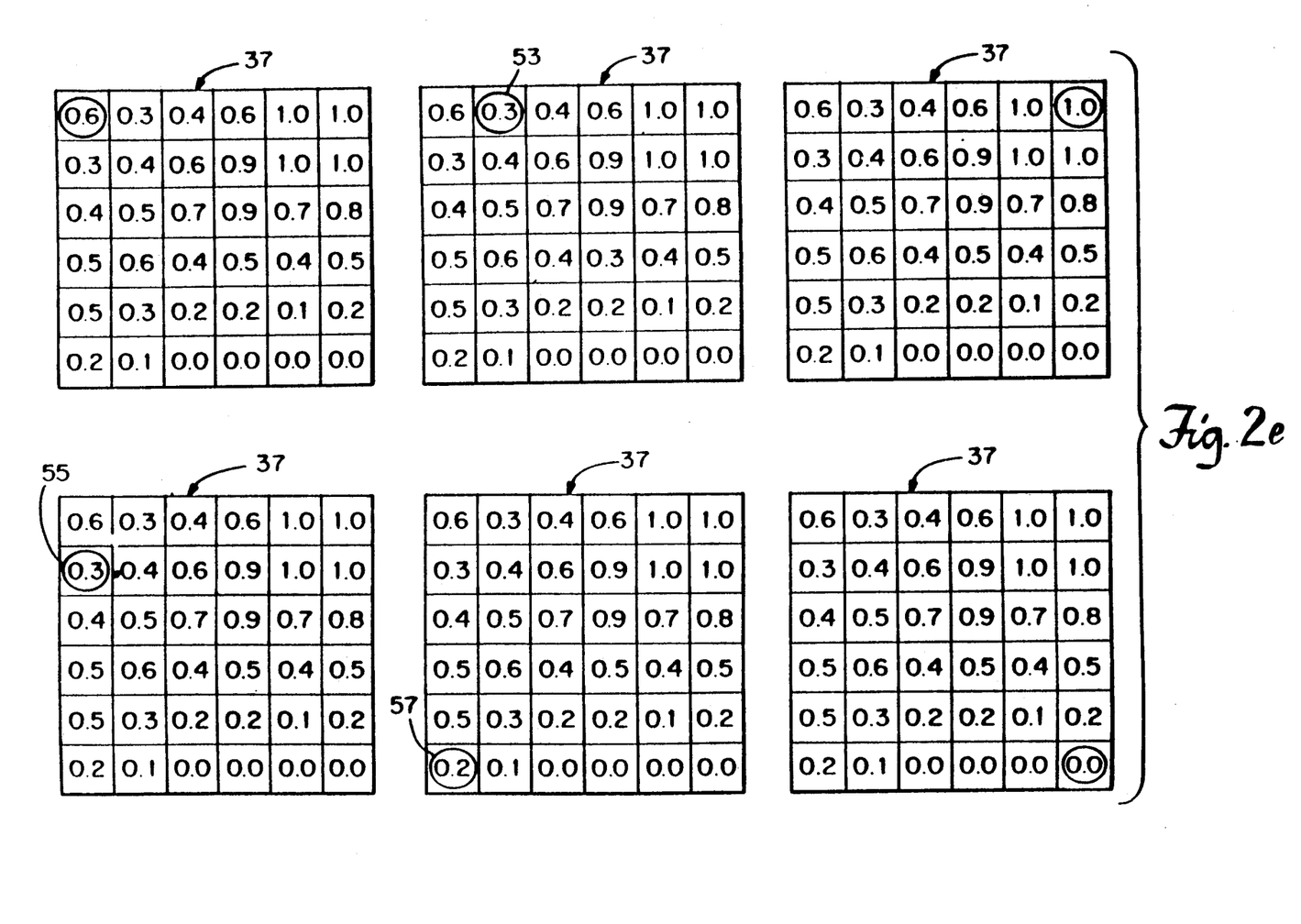

As mentioned previously for each pixel position of the sampling window 45, a grayscale value from a corresponding pixel in grayscale bitmap 37 is obtained and stored at the address formulated from the values of the pixels covered by the sampling window 45. Said another way, the grayscale value at the grayscale bitmap pixel position analogous to the bitonal bitmap pixel position of sampling window center 47 is stored at the address formulated from the sampling window at that position. FIG. 2e highlights (in circles) the grayscale values from grayscale bitmap 37 which correspond to the six pixel positions of sampling window 45 illustrated in FIG. 2d. The grayscale value 0.6 in the upper left corner pixel of grayscale bitmap 37 is stored at lookup table address "00100" formulated from sampling window 45 centered on the upper left corner pixel of bitonal bitmap 39 (FIG. 2d). The grayscale value 0.3 from grayscale bitmap 32 position 53 (FIG. 2e) corresponds to the next binary bitmap pixel position of sampling window 45 in FIG. 2d and hence is stored at the address "01000" formed from that pixel position. The grayscale value 1.0 of the last pixel in the first row of grayscale bitmap 37 is stored at lookup table address "01101", the address formed by sampling window 45 centered on the last pixel in the first row of bitonal bitmap 39. Similarly the grayscale bitmap values 0.3, 0.2 and 0.0 highlighted in the lower row of illustrated grayscale bitmaps 37 in FIG. 2e correspond to the addresses "10000", "10000" and "00000" respectively, formed by the sampling window 45 positions in bitonal bitmap 39 illustrated in the lower row of FIG. 2d.

As can be seen, it is possible that the same address is formulated from different pixel positions in bitonal bitmap 39, and that for each such pixel position the corresponding pixel positions in grayscale bitmap 37 hold different grayscale values. As a result there is more than one distinct grayscale value for a single (entry) of lookup table 43 address which presents a so called "conflict". For example, the address "10000" is formed by sampling window 45 centered at the first pixel in the second row and again at the first pixel in the last row in bitonal bitmap 39 as shown in the lower row of FIG. 2d. For the former bitonal bitmap pixel position, the corresponding grayscale bitmap pixel position 55 (FIG. 2e) holds a value of 0.3. For the later bitonal bitmap pixel position, the corresponding grayscale bitmap pixel position 57 (FIG. 2e) holds a value of 0.2. Thus for lookup table address "10000", there are two conflicting grayscale values (0.3 and 0.2).

In conflict situations, the grayscale values are averaged and a standard deviation is tracked. A high overall standard deviation indicates that the sampling window 45 is too small or shaped incorrectly, and that there are not enough pixels (bits) in the window to discriminate between two fundamentally antialiasing cases. As long as the standard deviation remains below a threshold (for example 0.05), the average grayscale value is used (i.e., stored in lookup table 43 at the subject address). If the standard deviation rises above the threshold, then a larger sampling window is chosen and the address formulation-grayscale assignment process is restarted (iterated) from the beginning of bitonal bitmap 39 and grayscale bitmap 37. For each such iteration with a larger sampling window, it is understood that respective longer addresses are formulated.

In the preferred embodiment, the sampling window is symmetrically shaped and the number of pixels (bits) covered by the sampling window 45 equals $4n+1$ where n is the iteration count (i.e, initial count $n=1$ and the sampling window covers $4(1)+1=5$ pixels (bits), the second iteration $n=2$ and the sampling window covers $4(2)+1=9$ pixels (bits), etc.). In addition, addresses formulated in the initial sampling are 5-bits long, and addresses formulated in the second iteration are 9-bits long, and so on.

Figure 2F:
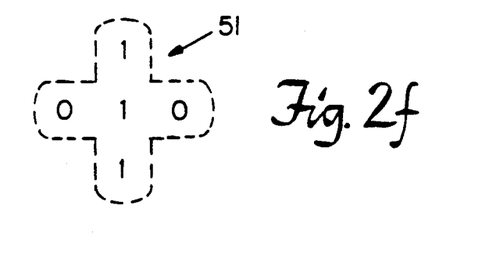

Further, all possible entry addresses to lookup table 43 may not be generated by the different sampling window positions in bitonal bitmap 39. That is, after sampling window 45 has been centered on each pixel position in bitonal bitmap 39, some entry addresses to lookup table 43 may remain to be defined. In those instances, the grayscale values are extrapolated from similar addresses formulated through the foregoing process involving sampling window 45. In particular, for a remaining address, say for example "10101" a target window 51 having the same t-shape as sampling window 45 is formed with the center, top arm and bottom arm each holding a one, and the side arms holding zeros, as illustrated in FIG. 2f. That is target window 51 is reverse engineered from the address of interest (i.e., a remaining address). Target window 51 is then compared to the pattern of values covered by sampling window 45 at each pixel position in bitonal bitmap 39. The bitonal bitmap pixel position at which sampling window 45 has a pattern of pixel values which most closely resembles the pattern of pixel values of the target window 51 (i.e., 10101) is determined. The grayscale value assigned to the address of that sampling window position in bitonal bitmap 39 is then assigned to the remaining address corresponding to the target window 51

Figure 2G:
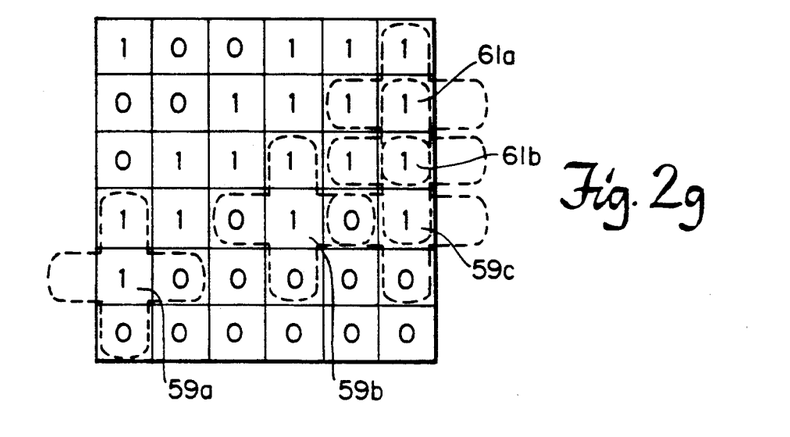

In the example of FIG. 2d, the bitonal bitmap pixel positions at which sampling window 45 has patterns of pixel values that most closely resemble that of target window 51 (FIG. 2f) are shown in FIG. 2g. Included are three pixel positions 59a, b, c from which the address "10100" is generated and two pixel positions 61a, b from which the address "11101" is generated. Each of these addresses differ by one bit from the target (remaining) address "10101". The corresponding grayscale value for the address "10100" is 0.5 (i.e., the average of the values of the grayscale bitmap pixel positions corresponding to the bitonal bitmap pixel positions 59a, b, c), and the corresponding grayscale value for the address "11101" is 0.9 (i.e., the average of grayscale bitmap values 1.0 and 0.8 corresponding to bitonal bitmap pixel positions 61a, b). One of these two grayscale values is assigned to the target address "10101" as described next.

In a preferred embodiment, the comparison between the target window 51 and the different pixel positions of sampling window 45 in bitonal bitmap 39 is accomplished using a weighted calculation. For each bitonal bitmap pixel position of sampling window 45, the value of the pixel covered by arm 49a of the sampling window 45 is compared to the value at the top arm of the target window 51, and likewise the values at the other arms 49b, c, d and center 47 of the sampling window 45 are compared to the respective values at the other arms and center of target window 51. Where there is a difference between the compared values, a weight is determined. Preferably, the weight equals the inverse of the distance from the center 47 of the sampling window to the arm 49 which differs in value from the value at the corresponding arm in target window 51. The sum of the generated weights is the weighted value of the sampling window 45 at that pixel position in bitonal bitmap 39. The bitonal bitmap pixel position of the sampling window 45 with the lowest weighted value is then determined and the corresponding grayscale value of that window position is assigned to the remaining address on which the target window 51 is based. In the case of multiple weights of least value, an average of the corresponding grayscale values is assigned to the target remaining address.

Figure 2H:
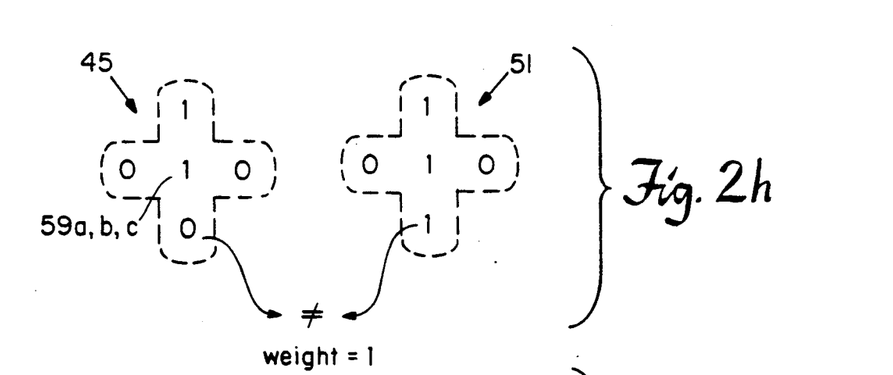
Figure 2I:
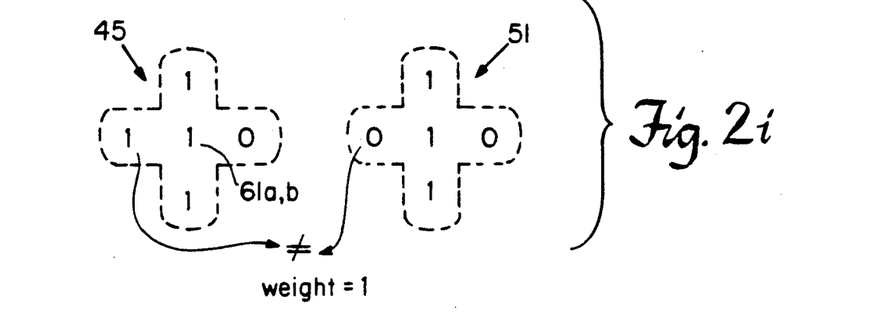

In the example of FIG. 2g, the weighting calculation is as illustrated in FIGS. 2h and 2i. The pattern of bitonal bitmap values covered by sampling window 45 positioned at 59a, b, or c is shown to the left of the pattern of values of target window 51 in FIG. 2h. Only the values of the bottom arms differ. The distance (in pixels) from the sampling window center to the bottom arm of the sampling window 45 is 1. The inverse of 1 equals 1 and this is the weighted value for sampling window 45 at pixel position 59a, b, c. If the values of other arms 49 of sampling window 45 at pixel position 59 had differed from values of respective target window arms, the inverse of the distance from the sampling window center to these arms 49 would have been included. The sum of all such inverse values would then define the weighted value for sampling window 45 at pixel position 59a, b, c.

Similarly, the pattern of bitonal bitmap values covered by sampling window 45 at position 61a, b is shown to the left of target window 51 in FIG. 2i. Only the values of left side arms differ. The distance (in pixels) from the sampling window center to the left arm of sampling window 45 is 1. And the resulting weighted value equals 1 (the inverse of the distance 1). Thus the average (0.7) of the corresponding grayscale values (0.5 and 0.9) of sampling window 45 at positions 59 and 61 is assigned to target address "10101".

Although the lookup table 43 is defined as described above, it is understood that it may be implemented in hardware, software or a combination thereof. Preferably lookup table 43 is implemented as a working memory, such as a ROM and the like, for time and CPU memory efficiency.

After being defined as described above, the lookup table 43 is employed in mapper 19 of FIG. 1. In particular, mapper 19 evaluates each pixel of bitonal bitmap 17 generated for desired output data 13, and for each pixel generates an entry address to lookup table 43. Mapper 19 then uses the corresponding grayscale value at the generated entry address of lookup table 43, to modulate the laser of a laser printer 25. The modulation at less than full intensity produces various shades of gray in the printing process. As a result the desired output data 13 is printed in grayscale.

In the preferred embodiment, mapper 19 uses sampling window 45 to evaluate each pixel of bitonal bitmap 17, and generates an address therefrom in the same manner as that described in FIGS. 2b-2d. That is, mapper 19 centers sampling window 45 on a subject bitonal bitmap 17 pixel, and from the pixel values of a neighborhood subset of pixels, including the subject pixel, formulates a 5-bit address (i.e., a 4n+1 bit address depending on the size of the sampling window as discussed above). Mapper 19 applies the 5-bit address to lookup table 43 and obtains the grayscale value held at that address in the lookup table 43. From the grayscale value, mapper 19 determines a pattern of modulation needed to produce a shade of gray corresponding to the obtained grayscale value. This is accomplished by a circuit assembly described in a co-filed Patent Application entitled "Modulation Circuit For Grayscale Laser Printing", by inventor Christopher M. Mayer assigned to the assignee of the present invention and herein incorporated by reference. The circuit assembly employs a lookup table or PAL or the like to determine modulation timing and intensity parameters for the obtained grayscale value. With these parameters the circuit assembly produces gray by modulating the laser at less than full intensity. That is, due to the two dimensional gaussian distribution of energy from the laser beam, a threshold region on the OPC drum shrinks in area, and the printed dot size decreases, leaving some white space around the black dot. The printer still operates at the same initial resolution. Furthermore, the scheme is direction independent (it effects both the main scan and sub scan directions on the paper equally). Dithering techniques are used to provide intermediate shades of gray from a darker and lighter generated shade.

EQUIVALENTS

While the invention has been particularly shown and described with reference to a preferred embodiment thereof, it will be understood by those skilled in the art that various changes in form and details may be made therein without departing from the spirit and scope of the invention as defined by the appended claims. For example, other shaped sampling windows and window sizes may be substituted for the "t" shaped window 45 described in the foregoing. Generally the sampling window should be symmetrical about a center which covers the bitonal bitmap pixel of interest. Other window design considerations are discussed in "Antialiasing Methods for Laser Printers" by Christopher M. Mayer, Massachusetts Institute of Technology, Department of Electrical Engineering and Computer Science, Master's Thesis, May, 1991, herein incorporated by reference.

I claim:

1. In a computer system having a digital processor, a printer, and means for generating a bitonal bitmap to support printer printout of processor output, the bitonal bitmap having a plurality of pixels, each pixel having a value, printer apparatus comprising:

a plurality of predetermined grayscale values derived from a learning pattern, the learning pattern representing typical continuous data; and a mapping member coupled between means for generating a bitonal bitmap and the printer for forming a grayscale bitmap from the bitonal bitmap, the grayscale bitmap having a plurality of pixels, each pixel of the grayscale bitmap corresponding to a respective pixel of the bitonal bitmap, the mapping member receiving the bitonal bitmap from the generating means and for each pixel of the bitonal bitmap, assigning a predetermined grayscale value to the corresponding pixel in the grayscale bitmap.

2. Printer apparatus as claimed in claim 1 wherein the mapping member assigns predetermined grayscale values to corresponding pixels in the grayscale bitmap according to a predefined mapping function, the predefined mapping function including, for each subject pixel of the bitonal bitmap, mapping a subset of pixels of the bitonal bitmap including the subject pixel to a predetermined grayscale value.

3. Printer apparatus as claimed in claim 2 wherein the predefined mapping function further includes a mapping of each possible subset, of a certain size, of pixels of a bitonal bitmap to a different grayscale value.

4. Printer apparatus as claimed in claim 1 wherein the mapping member further includes a working memory having a plurality of memory addresses and holding the predetermined grayscale values, one at each memory address of the working memory, for each subject pixel of the bitonal bitmap, the mapping member (a) establishing a subset of pixels of the bitonal bitmap including the subject pixel, (b) defining a memory address to the working memory from pixel values of the established subset of pixels, and (c) using the defined memory address to the working memory, accessing the predetermined grayscale value held at the defined memory address, the mapping member assigning the accessed predetermined grayscale value to the pixel in the grayscale bitmap corresponding to the subject pixel of the bitonal bitmap.

5. Printer apparatus as claimed in claim 1 wherein the plurality of predetermined grayscale values further comprises averages between working grayscale values.

6. Printer apparatus for use in a computer system comprising:

bitmap generating means for receiving from a digital processor a desired data and for generating a bitonal bitmap to support printout of the desired data, the bitonal bitmap having a plurality of pixels each having a respective pixel value;

a plurality of predetermined grayscale values derived from a learning pattern, the learning pattern representing typical continuous data;

a mapping member coupled to receive the bitonal bitmap from the bitmap generating means, the mapping member forming a grayscale bitmap from the bitonal bitmap according to a predefined mapping function, the grayscale bitmap having a plurality of pixels, each pixel of the grayscale bitmap corresponding to a respective pixel of the bitonal bitmap and having a grayscale value, the predetermined mapping function including for each subject pixel of the bitonal bitmap, mapping a subset of pixels of the bitonal bitmap including the subject pixel to a predetermined grayscale value; and print means coupled to the mapping member for receiving therefrom the formed grayscale bitmap, the print means being capable of grayscale printing and the formed grayscale bitmap enabling the print means to printout, in grayscale, the desired data.

7. Printer apparatus as claimed in claim 6 wherein the predefined mapping function further includes a mapping of each possible certain sized subset of pixels of a bitonal bitmap to a different grayscale value.

8. Printer apparatus as claimed in claim 6 wherein the mapping member includes a working memory having a plurality of memory addresses and holding the predetermined grayscale values, one at each memory address of the working memory, for each subject pixel of the bitonal bitmap, the mapping member (a) establishing a subset of pixels of the bitonal bitmap including the subject pixel, (b) defining a memory address to the working memory from pixel values of the established subset of pixels, and (c) using the defined memory address to the working memory, accessing the predetermined grayscale value held at the defined memory address, the mapping member assigning the accessed predetermined grayscale value to the pixel in the grayscale bitmap corresponding to the subject pixel of the bitonal bitmap.

9. Printer apparatus as claimed in claim 6 wherein the plurality of predetermined grayscale values further comprises averages of at least two working grayscale values.

10. In a computer network having a digital processor, a printer, and means for generating a bitonal bitmap to support printer printout of desired processor output data, the bitonal bitmap having a plurality of pixels each pixel having a respective value, a method of printing desired processor output data comprising the steps of:
   providing a plurality of predetermined grayscale values;
   forming a grayscale bitmap of the desired processor output data from the bitonal bitmap of the desired processor output data, the grayscale bitmap having a plurality of pixels, each pixel of the grayscale bitmap corresponding to a respective pixel of the bitonal bitmap and having a grayscale value, said step of forming a grayscale bitmap including, for each pixel of the bitonal bitmap assigning a predetermined grayscale value to the corresponding pixel in the grayscale bitmap; and
   providing the grayscale bitmap to print means capable of grayscale printing, the grayscale bitmap enabling the print means to printout in grayscale the desired processor output data.

11. A method as claimed in claim 10 wherein the step of forming a grayscale bitmap further includes, for each subject pixel of the bitonal bitmap, mapping a subset of pixels of the bitonal bitmap including the subject pixel to a predetermined grayscale value.

12. A method as claimed in claim 11 wherein the mapping includes:
   defining a memory address to a working memory from pixel values of the subset of pixels of the bitonal bitmap including the subject pixel, the working memory holding a different value at each of a plurality of memory address; and
   using the defined memory address to the working memory, accessing the value stored at the defined memory address and assigning the accessed value as the predetermined grayscale value to the pixel in the grayscale bitmap corresponding to the subject pixel of the bitonal bitmap.

13. A method as claimed in claim 10 wherein the step of forming a grayscale bitmap is according to a predetermined mapping function defined by a mapping of each possible subset, of a certain size, of pixels of a bitonal bitmap to a different grayscale value in the plurality of predetermined grayscale values.

14. A method as claimed in claim 13 wherein the plurality of grayscale values includes averages between working grayscale values.

15. Printer apparatus as claimed in claim 1 further comprising a plurality of predetermined grayscale values including values established from non-linear functions of working grayscale values.

16. Printer apparatus as claimed in claim 1 further comprising a plurality of predetermined grayscale values including weighted sums of working grayscale values.

17. Printer apparatus as claimed in claim 2 wherein the predefined mapping function is established from the learning pattern.

18. Printer apparatus as claimed in claim 6 further comprising a plurality of predefined grayscale values including values established from non-linear functions of working grayscale values.

19. Printer apparatus as claimed in claim 6 further comprising a plurality of predetermined grayscale values including weighted sums of working grayscale values.

20. Printer apparatus as claimed in claim 6 wherein the predefined mapping function is established from the learning pattern.

21. A method as claimed in claim 10 wherein the step of forming a grayscale bitmap further includes providing a working memory holding a plurality of grayscale values, one at each of a plurality of memory addresses, the working memory being established by:
   (i) generating from a learning pattern representative processor output data;
   (ii) converting the generated data into a working bitonal bitmap comprising a plurality of pixels, each having a pixel value;
   (iii) converting the generated data into a working grayscale bitmap comprising a plurality of pixels, each corresponding to a different pixel of the working bitonal bitmap, and each having a grayscale value; and
   (iv) for each subject pixel of the working bitonal bitmap, forming a memory address to the working memory from a subset of the pixels of the working bitonal bitmap including the subject pixel, and at the formed memory address storing grayscale value of the working grayscale bitmap pixel corresponding to the subject pixel of the working bitonal bitmap,
such that for each pixel of the bitonal bitmap, one of the memory addresses of the working memory is accessed and the grayscale value stored at the memory address is assigned to the corresponding pixel in the grayscale bitmap to form the grayscale bitmap.

22. A method as claimed in claim 21 wherein the working memory is established further by averaging grayscale values of working grayscale bitmap pixels stored at a formed memory address where corresponding working bitonal bitmap pixels form the same memory address to the working memory.

23. A method as claimed in claim 21 wherein the working memory is established further by computing a weighed sum of grayscale values of working grayscale bitmap pixels stored at a formed memory address where corresponding working bitonal bitmap pixels form the same memory address to the working memory.

24. A method as claimed in claim 21 wherein the working memory is established further by non-linearly combining grayscale values of the learning pattern for a memory address to the working memory, commonly formed by different subsets of working bitonal bitmap pixels.

25. A method as claimed in claim 21 wherein the working memory is established further by the steps of:
  after storing grayscale values at memory addresses formed for each of the subject pixels of the working bitonal bitmap, identifying remaining memory addresses of the working memory; and
  for each remaining memory address, calculating a grayscale value as a function of grayscale values stored at similar memory addresses of the working memory, and storing the calculated grayscale value at the remaining memory address,
  such that a grayscale value is stored at each of the plurality of memory addresses of the working memory.

* * * * *

UNITED STATES PATENT AND TRADEMARK OFFICE
CERTIFICATE OF CORRECTION

PATENT NO. : 5,185,852
DATED : February 9, 1993
INVENTOR(S) : Christopher M. Mayer, et al It is certified that error appears in the above-indentified patent and that said Letters Patent is hereby corrected as shown below:

On the title page, Item [75] Inventors:

add co-inventor: V. Michael Bove, Jr.

Signed and Sealed this

Eighteenth Day of January, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,185,852
DATED : February 9, 1993
INVENTOR(S) : Christopher M. Mayer It is certified that error appears in the above-indentified patent and that said Letters Patent is hereby corrected as shown below:

On the title page: Item [73], Assignee

Massachusetts Institute of Technology
77 Massachusetts Avenue
Cambridge, Massachusetts 02139

Signed and Sealed this

Twenty-sixth Day of July, 1994

Attest:

BRUCE LEHMAN

*Attesting Officer*    *Commissioner of Patents and Trademarks*